United States Patent [19]
Knapp

[11] 3,779,843
[45] Dec. 18, 1973

[54] CONTINUOUS PROCESS FOR PRODUCING CONSOLIDATED LIGNOCELLULOSIC MATERIAL

[76] Inventor: Hans John Knapp, 2035 S.W. 58th Ave., Portland, Oreg. 97221

[22] Filed: Jan. 21, 1971

[21] Appl. No.: 108,508

[52] U.S. Cl.............. 156/64, 100/93 P, 156/62.2, 156/282, 156/285, 156/358, 156/360
[51] Int. Cl............................................. B29j 5/04
[58] Field of Search.................. 156/64, 39, 62.2, 156/62.4, 282, 285, 311, 312, 350, 351, 356, 358, 359, 360, 369, 372, 373, 376; 161/166; 264/109, 113, 118, 128; 100/93 P

[56] References Cited
UNITED STATES PATENTS

| | | | |
|---|---|---|---|
| 3,021,244 | 2/1962 | Meiler.............................. | 156/62.2 |
| 3,521,552 | 7/1970 | Knapp.............................. | 100/93 P |
| 2,830,924 | 4/1958 | Witt................................. | 156/282 X |
| 2,907,071 | 10/1959 | Meiler et al. ....................... | 264/118 |
| 3,098,781 | 7/1963 | Greten.............................. | 156/373 |

Primary Examiner—George F. Lesmes
Assistant Examiner—M. E. McCamish
Attorney—Seed, Berry & Dowrey

[57] ABSTRACT

Hardboard and particleboard is continuously made by a continuous multi-stage press which allows humidified consolidated fibrous material to exit from the press without blisters or delamination and without the need of a subsequent humidification process. A control system is provided to insure that the end product has uniform properties. A preformed mat of moist fibrous material to which wax or other water repellent sealer and a thermosetting resin have been added is fed into a precompresser of conventional design wherein the mat is consolidated to an intermediate density without cure of the resin therein. From the precompresser the precompressed mat is fed into the nip of a continuous multi-stage press having multiple heat and pressure zones therein. Initially the mat is pressed momentarily to a pressure of up to 1,000 pli and then passed through subsequent sections of the press wherein the temperature and pressure are modified while the board is progressing through the press to (1) cure the resin in the consolidated material, and then (2) cool the consolidated mat while under pressure to prevent formation of gas pockets or blisters in the board. The cooling stage of the press is so designed to permit pressure release with sufficient moisture control in the board equal to the equilibrium moisture content control usually attained in a subsequent conventional humidification process. By this means it is possible to form a fiber mat with higher moisture content than feasible in a conventional curing cycle thereby obtaining better board properties because of the increased plastic flow under pressure. After formation of the mat, after precompression, and at the exit end of the press sensing means are provided to continuously measure properties of the board, particularly mass density, moisture content and thickness. The output values are compared with predetermined values and the amount of fiber, wax, resin, moisture, and the press conditions varied to obtain predetermined properties in the board.

5 Claims, 2 Drawing Figures

INVENTOR.
HANS JOHN KNAPP

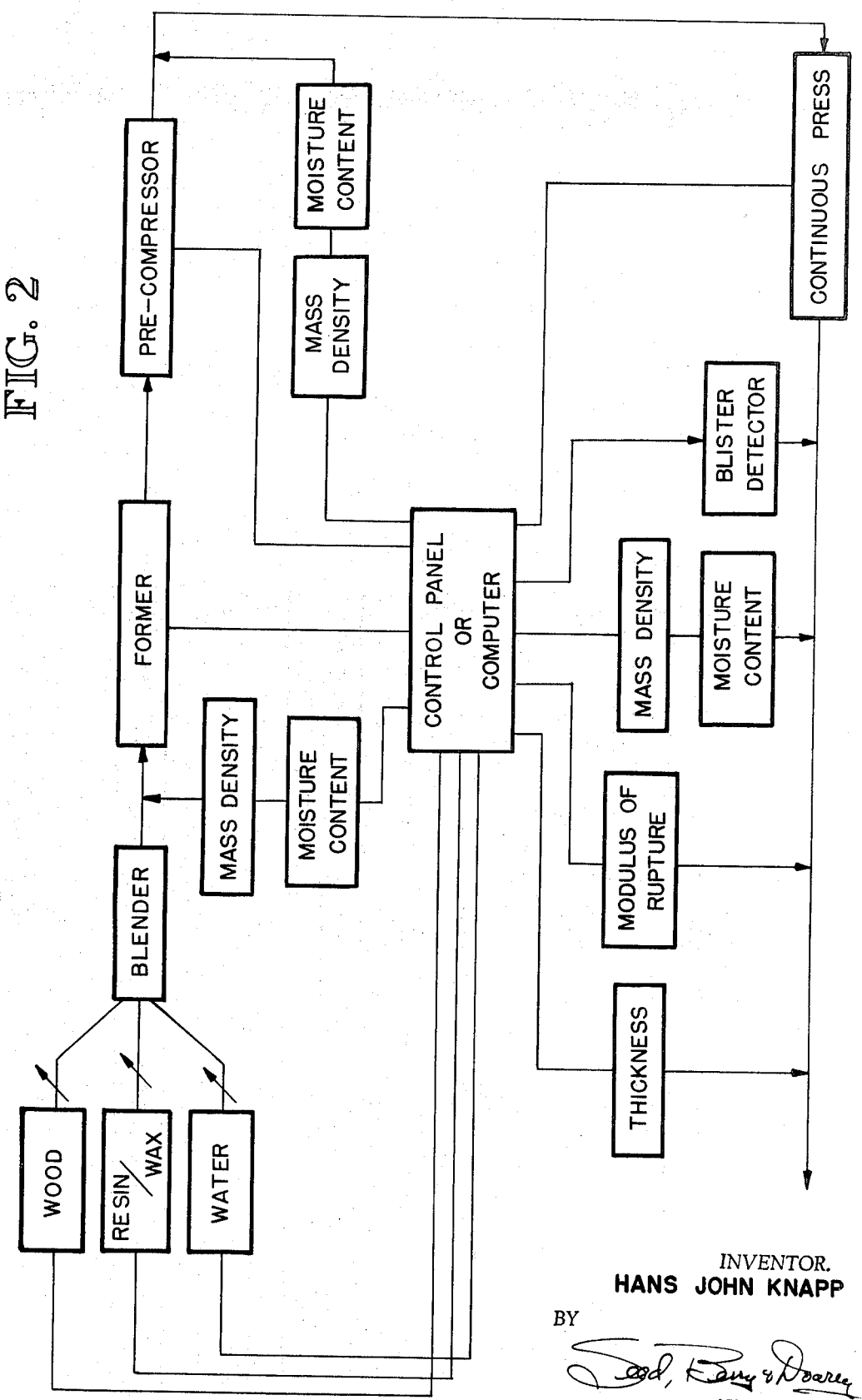

CONTINUOUS PROCESS FOR PRODUCING CONSOLIDATED LIGNOCELLULOSIC MATERIAL

BACKGROUND OF THE INVENTION

1. Field of the Invention

This invention relates to a process for the continuous manufacture of consolidated materials such as hardboard and particleboard.

2. Prior Art Relating to the Disclosure

Consolidated board is conventionally made by initially precompressing a moist mat of lignocellulosic fiber to which a thermosetting resin and wax have been added. The mat, once precompressed to the desired density is cut into sections and multiple sheets stacked in a multiple opening press for final cure of the resin in the board. During pressing there is a constant cycle of vapor formation, migration of the vapor to cooler areas and condensation of the vapor. The cured board exiting from the press is substantially "bone dry" and must be rehumidified to stabilize it against warpage and shrinkage.

Processes have been proposed for the continuous production of consolidated board. For example see U.S. Pat. No. 2,907,071 and U.S. Pat. No. 3,021,244. U.S. Pat. No. 2,907,071 discloses a process for producing hardboard wherein a moist mat of wood fiber containing a thermosetting resin and a wax is passed between heated pressure rolls to momentarily press the mat to a density less than the final density and the resulting mat pressed into a final or low pressure stage wherein the heat and pressure is sufficient to cure the resin in the compressed mat. U.S. Pat. No. 3,021,244 discloses much the same process but mentions that the compressed mat may be passed through an endless belt press to compress the mat to final density and cure the resin therein. Neither patent discloses cooling of the compressed mat for vapor pressure and M/C control in a continuous press nor measuring properties of the board during formation and on exit from the press to control the press conditions and other variables to produce a board of predetermined properties.

SUMMARY OF THE INVENTION

This invention relates to a process for the continuous manufacture of consolidated materials such as hardboard and particleboard. It is a primary object of this invention to provide a process for making consolidated materials utilizing a continuous multi-stage press wherein it is possible to continuously monitor the conditions under which the consolidated material is made, thereby obtaining a product of uniform quality.

It is a further object of this invention to provide a process for the continuous manufacture of consolidated board utilizing a continuous multi-stage press wherein the consolidated material, after being subjected to heat and pressure to consolidate and cure the resin in the material, is passed into a cooling section of the press which cools the board while maintaining it under pressure until the vapor pressure within the board is reduced by cooling to the point where the vapor pressure is less than the internal bond strength of the board at that stage of the curing process. At such time release of pressure on the board can occur with sufficient moisture content retained in the board to eliminate the need of subsequent humidification.

BRIEF DESCRIPTION OF THE DRAWINGS

FIG. 2 is a schematic diagram of the instrumentation used to monitor and continuously control properties of the consolidated board during manufacture.

DETAILED DESCRIPTION OF THE INVENTION

Figure 1:
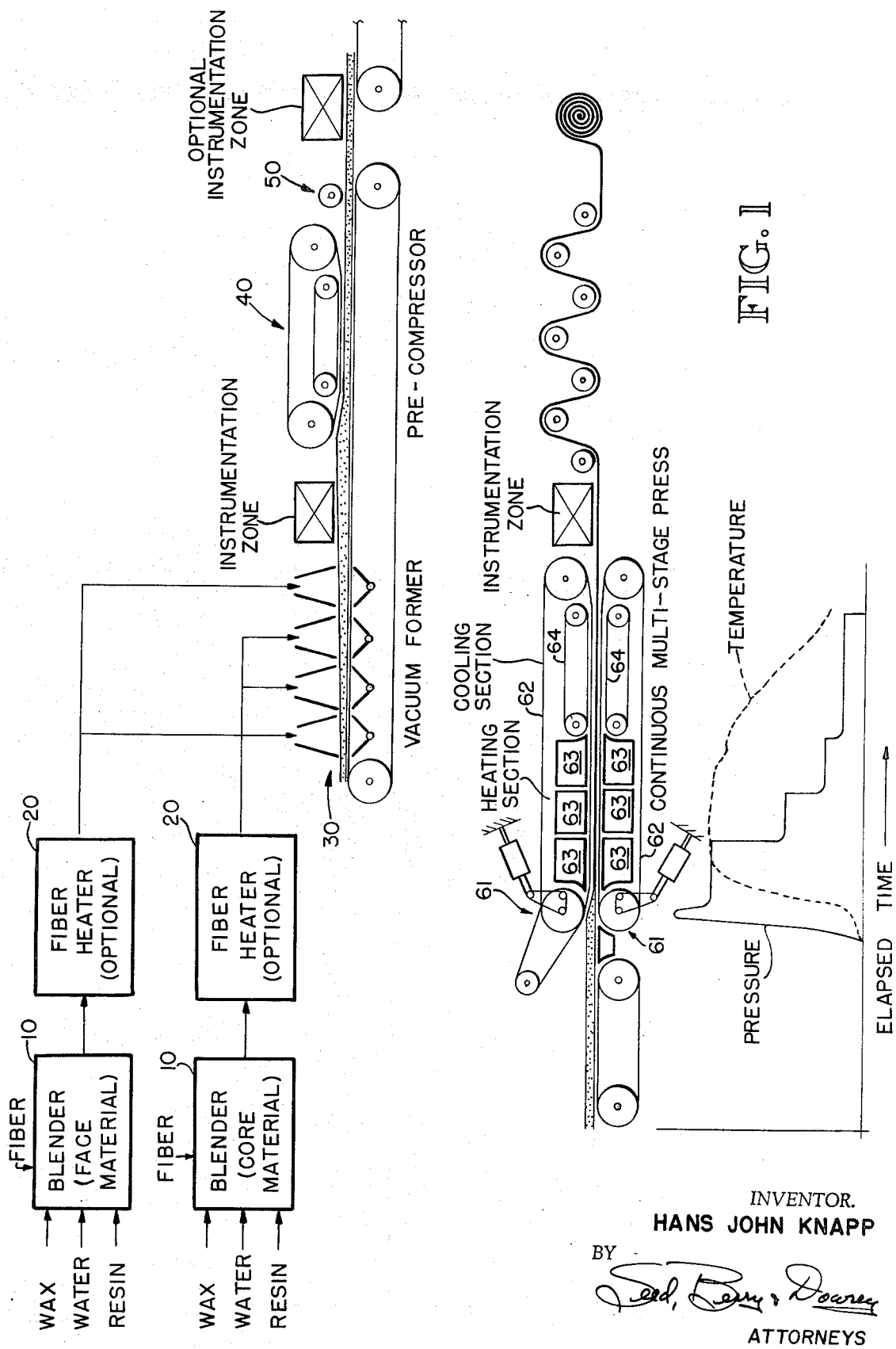
FIG. 1 is a schematic illustration of the continuous process for the production of hardboard using a continuous multi-stage press.

The consolidated board of this invention may be formed from wood of different species of trees. Coniferous trees such as cedar, pine, hemlock and Douglas fir are suitable as well as deciduous trees such as alder, maple, and birch. Particleboard is generally made from wood flakes process through a machine capable of reducing wood of various sizes and shape into wood flakes of various sizes. There are several commercially available machines for flaking wood such as the Pallmann flaker, the Ortmann flaker, or the Hombak flaker. For a discussion of the operation of these machines reference is made to the "Proceedings of the First Symposium on Particleboard," Mar. 1967, edited by Thomas M Maloney, pp. 77 to 116. Hardboard is generally made from wood processed through an attrition mill such as a Bauer refiner.

Referring to FIG. 1 which illustrates a schematic diagram for making consolidated board. Refined fiber having a moisture content of 0 to 25 percent, based on the bone dry weight of the fiber, is introduced into blenders 10 along with a hydrocarbon wax or other suitable water repellent material, a thermosetting resin, and additional moisture, if needed. Thermosetting resins generally used are generally of the phenol-formaldehyde or urea-formaldehyde type, enough resin being blended with the fiber to bind the fibers together and impart the required strength to the board. The amount of resin generally is less than 10 weight percent and preferably from 1 to 3 percent. The wax blended in with the fiber is generally a hydrocarbon wax introduced as a powder or solution. As indicated two wood furnishes may be provided, a core material and face material. Generally the core material is provided with a higher moisture content than the face material.

From the blenders the moist fibers coated with the thermo-setting resin and wax may be passed into fiber heaters 20 which preheat the fibers to a temperature of 100° to 200° F. The loose fiber is then formed into a continuous mat of uniform density by a mat forming machine 30. The mat forming machine meters the fiber or particles based on an average bulk density, spreads it uniformly across the width of the machine, and meters it to fall on a caul or belt. There are many commercially available forming machines capable of continuously forming a uniform mat, such as the Bahre Bison former, the Columbia Microfelter, and others. Reference may be made to pages 311 to 338 of the "Proceeding of the First Symposium on Particleboard," Mar. 1967, referred to previously, for a discussion of forming machines. A preferred method of forming a continuous mat is with a vacuum former manufactured by Washington Iron Works, Seattle, Washington, As shown in FIG. 1, four stations are provided, the first station laying down a furnish of face material, the second and third stations laying furnishes of core material and the fourth station laying a furnish of face material over the top of the core material. In processing through the former the mat of loose fibers is shaved to uniform thickness and the loose continuous mat compacted by passing it between opposed belts of a conventional precompressor 40. The precompressor compacts the loose fibrous mat sufficiently to impart sufficient strength for cauless transfer to the continuous press. The compacted mat may have its edges trimmed by an edge trim saw 50 after passage through the precompressor. On exit from the precompressor the compacted mat enters the nip of a continuous multi-stage press 60 wherein the temperature and pressure conditions exerted on the mat can be varied to form a product of desired quality. The continuous press is of the endless caul belt type utilizing opposed caterpillars which frictionally pull the opposed caul belts through a stationary press section and at the same time exert a squeezing pressure. The platens of the stationary press sections are faced with a solid lubricant to which a liquid is applied having the property of decreasing the friction between the solid lubricant and the caul belts without affecting the coefficient of friction between the platen links of the caterpillars and the caul belts. Such an endless press is described in U.S. Pat. No. 3,521,552, the disclosure of which is hereby incorporated by reference.

The compacted mat is initially passed between two opposed pressure rolls 61 over which the opposed endless caul belts 62 ride, the pressure ranging up to 1,000 pli (pounds per linear inch) at a speed of from 50 to 250 feet per minute. The opposed high pressure rolls momentarily press the mat to a density and thickness close to the final density and thickness. The mat springs back somewhat after exit from the pressure zone of the two pressure rolls. From the two pressure rolls the mat enters between the opposed caul belts in a stationary press section 63 wherein opposed heated platens subject the mat to heat and pressure. The number of opposed stationary platen sections may be varied depending on the product desired. From the stationary press sections the mat passes into one or more caterpillar sections 64 wherein the mat is cooled under pressure to allow pressure release of the board with sufficient moisture content in the board equal to the equilibrium moisture content of the board. Instead of cooling the caterpillar sections or in addition thereto, one or more of the stationary platen sections may be cooled. The number of temperature and pressure zones within the continuous press may be varied depending on the properties of the board desired. Generally the temperature and pressure conditions in the stationary platen sections of the press should be high enough to permit proper consolidation of the mat to the required density and to cure the resin in the mat. The temperature should not be so high as to burn or char the outer surfaces of the mat. Higher temperatures than normally used in processes of the prior art can be used, however, as the mat is in contact with the high temperature platens only for a short period of time. Additionally, since there is no daylight under heat as occurs in a multiple opening press, precure of the resin is eliminated thereby making higher curing temperatures feasible.

The diagram of pressure and temperature versus elapsed time in FIG. 1 illustrates a possible range of temperature and pressure conditions which may be used in the production of hardboard. Other temperature and pressure conditions may be employed, however, depending on the speed at which the press is operated, the moisture content of the compressed mat, the resin content of the mat, and other variables. The compressed mat, after passing through the opposed pressure rolls momentarily subjecting the mat to a pressure up to 1,000 pli passes into a first section of the press wherein the mat is subjected to a pressure up to 800 psi at 300° to 800° F. In this section of the press migration of heat to the interior of the board is initiated to cure the resin in the board. The board is not left in contact with the heated platens for a long enough time to char the outer surfaces, however. The high temperature used in the first section is capable of initiating migration of heat to the interior of the board without precuring of the resin in the outer surfaces of the board. Casehardening of the outer surfaces is also minimized. From the first section of the press the board passes through a second section maintained at a pressure of from 20 to 400 psi at a temperature of from 300° to 600° F. where migration of the heat to the interior of the board sufficient to cure the resin is continued. The board then passes into a third section of the press maintained at a temperature of from 200° to 400° F. at a pressure of 100 to 400 psi which further continues curing of the resin in the board. The temperature in this final section is below the charring temperature of the product. A slight gap between each of the stationary heated platens may be provided to allow the board to breathe as it passes through the heating sections of the press.

Upon exit from the stationary platen sections of the press the board passes into a caterpillar section which may be either heated or cooled or used merely as a horizontal transport. The caterpillar sections may be cooled by blowing cooling air against the caterpillar sections or by refrigeration. As is true with the stationary platen zones the caterpillar sections may be divided into separate zones which can be individually heated or cooled and the pressure of each zone controlled. Preferably the board is passed into a first caterpillar zone maintained at a pressure of 50 to 200 psi and a temperature of 0° to 200° F. where the outer surfaces of the board are cooled while cure of the resin in the interior of the board is proceeding. In the second caterpillar zone the board is further cooled and time is allowed for the moisture in the interior of the board to migrate to the outer surfaces of the board, thereby equalizing the moisture content through the board at the press end. The temperature and pressure conditions of the final stages of the press can be carefully controlled as desired to allow the board to assume equilibrium moisture content before exit from the press. Cooling of the board as as integral bases of board manufacture has not been economically feasible with any of the multiple opening presses of the prior art. The versatile press described in U.S. Pat. No. 3,521,552 provides a means for carefully controlling the temperature and pressure conditions over a wide range during manufacture of hardboard or particleboard.

Moisture content of the mat during pressing is extremely important to the resultant properties of the board. The moisture content of the mat can affect such variables as board thickness, curing time, heat transfer within the mat, plasticization of the wood particles, density, modulus of rupture, modulus of elasticity, internal bond strength, linear expansion and thickness swell.

The mat, on first entering the continuous press, is passed between heated platens which set up a temperature gradient between the outer surfaces of the board and the interior or core, and between the center of the board and the side edges. Vapor escapes from the board during pressing because of the vapor pressure gradient between the interior of the board and its outer surfaces. The vapor pressure and temperature gradients change during pressing with the vapor pressure gradient lagging behind the temperature gradient during the initial part of the cycle. The cooling section of the continuous press enables the board to be cooled under pressure with resulting reversal of the vapor pressure gradient and flow back to dried out areas of the pressed mat near the outer surfaces. When the vapor pressure is less than the internal bond strength of the board, the pressure on the board can be released with sufficient moisture content retained in the board to eliminate the need of subsequent humidification.

INSTRUMENTATION

Means are provided for continuously measuring the physical properties of the mat at various stages during production. The output values of the various measured values are compared with predetermined values and the press conditions and other variables altered to bring the measured values in line with the predetermined values. This may be done manually, by computer or other means.

Referring to FIGS. 1 and 2, instrumentation zones are provided (1) after formation of the mat of loose fibers coated with resin and wax, and (2) after exit from the continuous press. An optional instrumentation zone may be provided after exit of the mat from the precompressor.

As the moisture content of the mat, during pressing, is extremely important to the resultant board properties careful control of the moisture content is desirable. Depending on the properties of the board desired the moisture content of the end product board can be carefully regulated by the process of this invention. A high mat moisture content gives an end product board which has improved water absorption, smoother surface (due to improved wood plasticization), improved dimensional stability and faster heat transfer up to 212° F. at atmospheric pressure. At the expense of the improved properties mentioned, however, a high mat moisture content tends to give an end product which has a low density core, lower strength, and low internal bond strength. "Blows" and "delamination" problems also occur more frequently with a high mat moisture content. "Blows" are ruptures in consolidated board which occur when the vapor pressure of the volatiles in the board exceeds the internal bond strength of the board. Blows occur when the pressure on the board is released at the exit end of the press at a point about one-half the distance between the surface of the board and the center. The three variables which most likely cause "blows" are wood density, board density and mat moisture content.

"Delamination" is a separation of particles at the core of the board and may be the result of low press temperatures, insufficient cure time, insufficient pressure, low resin content, or other variables.

By continuously measuring the most significant variables at various places during formation of the board the variables can be controlled to effect a board of desired and uniform properties. Two of the significant variables which are measured after formation of the mat, optionally after precompression and at the exit end of the press are the mass density and moisture content of the mat. Preferably the two variables are measured across the width of the mat. This is done by placing the detectors of the instruments on a rail running laterally to the direction of movement of the mat. Instruments for determining mass density of a cellulosic mat on a continuous basis are commercially available. One such instrument is a nuclear gage manufactured by The Ohmart Company. Such gages are designed to measure total mass. Variations in width of the board as well as its weight per unit area per a given length can be measured. If conveyor speed is also measured the total weight can be determined by integrating the mass flow rate with respect to time. Reference may be made to "Proceeding of Third Washington State University Symposium on Particleboard," Mar. 1969, edited by Thomas M. Maloney, pp. 113 to 123 for a discussion of the use of nuclear gages.

Instruments for determining moisture content of a cellulosic mat on a continuous basis are also commerically available, such as those manufactured by Laucks Laboratories. Reference may be made to pages 45 to 72 of the above-mentioned publication for a discussion of the measurement of moisture content in consolidated board. The measured values of mass density and moisture content may be recorded by a strip recorder which records the density profile across the width of the mat. It is also desireable to have further readout information of the mass density of the mat along the length of the mat in order to maintain the mass density constant. Integration of the measured values of mass density and moisture content enables calculation of the density of the mat. If the density profile across the width of the mat is not uniform the information may be used to manually or automatically control the former to adjust the amount of fiber layed down. If the moisture content is too high the measured moisture content value is used to control the amount of moisture added to the fiber in the blender.

After passing through the precompressor an optional instrumentation zone may be provided for measuring mass density and moisture content.

After passage through the continuous press the formed board is passed through an instrumentation zone wherein, in particular, mass density and moisture content of the formed board across the width thereof are measured. It is also desirable to provide a blister detector, such as an ultrasonic detector, and a continuous modulus of rupture device which measures the deflection of the board under load. Instruments capable of measuring the modulus of rupture of the board and detecting blisters in the board are known and commercially available. A discussion of the application of ultrasonic detectors for detecting "blows" and "delamination" in consolidated board may be found on pages 149 to 161 of the publication referred to previously.

Integration of the values of moisture content and mass density of the board exiting from the press enables calculation of the density of the board. The measured values of mass density and moisture content can be used to control a number of variables which affect board density including such variables as resin content, moisture added to the mat, temperature and pressure in the continuous press and curing time.

"Blows" or "delamination" in the finished product are usually formed as a result of too much moisture in the board or too little pressure exerted on the board during cooling. If the vapor pressure in the board exceeds the external pressure exerted on the board at any time during the pressing cycle blisters may occur due to blowout of the steam within the board. The blister detector continuously monitors the finished product. If any blisters are detected, internal or otherwise, the moisture content of the board may be reduced, the pressure increased, the temperature reduced or the cure time lengthened.

The instrument which measures the modulus of rupture of the board gives an indication of the internal strength of the board. Lack of adequate internal strength in the board may be the result of inadequate cure of the resin in the interior of the board. If the internal strength of the board is low the temperature during the pressing cycle may need to be raised to get more heat into the interior of the board before cooling of the board begins, or the line speed may be changed to increase time to cure.

When the process outline is used for making "thin" hardboard, that is hardboard having a thickness of one-eighth inch or less, the finished product exiting from the press can be led over surge rolls and coiled up into the coils for storage as shown in FIG. 1. It is possible, utilizing the process of this invention, to operate at press speeds ranging from 50 to 250 feet per minute. The length of each of the heating and/or cooling sections and the pressures and temperatures necessary in each section to obtain a board of desired properties can be determined by one skilled in the art.

The process of this invention is adaptable to the manufacture of either hardboard or particleboard. In the manufacture of particleboard the mat of loose material may be precompressed although it is generally not necessary to precompress the loose mat before entry into the continuous press. The temperature and pressure requirements for the production of particleboard utilizing the multi-stage press may be different than those used in the production of hardboard. Cooling of the particleboard is not as necessary as in hardboard because the large pores in particleboard allow internal moisture to bleed out rapidly and stabilize the board.

The process of this invention provides a continuous method of making hardboard and particleboard of improved quality. By continuously monitoring the physical properties of the finished board exiting from the continuous press and accurately controlling the numerous variables which determine the physical properties, board of uniform properties can be obtained. Hardboard can be produced with uniform density across the length thereof, uniform thickness, and no blows or delamination. The process also allows the hardboard to retain sufficient moisture content in the final stages of the multi-stage press, thereby eliminating the need of additional humidification equipment, additional handling with its usual breakage or additional personnel requirements.

The embodiments of the invention in which an exclusive property or privilege is claimed are defined as follows:

1. A process of making continuous sheets of consolidated lignocellulosic material comprising, forming a continuous mat of indefinite length of moist wood fiber coated with a thermosetting resin and a water repellent sealer, compressing the mat to impart sufficient strength thereto for caulless transfer thereof, feeding the compressed mat into the nip of a continuous multi-stage press between opposed endless caul belts, the press having multiple temperature and pressure zones therein, applying sufficient heat and pressure to the mat to consolidate the mat and to cause sufficient heat to migrate into the interior thereof to cure the resin therein, modifying the temperature and pressure exerted on the consolidated mat while progressing at a predetermined speed through the press to complete cure of the resin throughout, and cooling the mat under pressure to allow flow-back of moisture within the mat to dried out areas near the outer surface and reduction of the vapor pressure within the mat to less than the internal bond strength of the mat so that, on pressure release, the mat retains sufficient moisture content to eliminate the need for subsequent humidification.

2. A process of making continuous sheets of consolidated lignocellulosic material comprising, forming a continuous mat of indefinite length of moist wood fiber coated with a thermosetting resin and a water repellant sealer, continuously measuring the mass density and moisture content of the formed mat, comparing the measured values of mass density and moisture content to predetermined values, controlling the amount of fiber used to form the mat and the amount of resin, sealer and moisture added to the wood fiber relative to the predetermined values, feeding the mat into the nip of a continuous multi-stage press between opposed endless caul belts, the press having multiple temperature and pressure zones therein and a predetermined press cycle relating pressure, pressing temperature and press speed, applying heat and pressure to the mat in the press sufficient to consolidate the mat to a predetermined density and to establish a temperature and vapor pressure gradient between the interior of the mat and the outer surfaces thereof in a first heating and pressure zone, continuing the application of heat and pressure on the mat in the press to complete cure of the resin throughout in one or more subsequent heating and pressure zones, cooling the outer surfaces of the mat under pressure in a cooling zone to reverse the temperature and vapor pressure gradients, the consolidated mat remaining under pressure with cooling to allow flow-back of moisture within the mat to dried out areas near the outer surfaces thereof and reduction of the vapor pressure within the mat to less than the internal bond strength thereof so that, on pressure release, the mat retains sufficient moisture content to eliminate the need for subsequent humidification.

3. The process of claim 2 including monitoring the consolidated mat on exit from the continuous multi-stage press to detect blows and delaminations therein, and controlling the pressing cycle of the press, the relative amounts of resin, sealer and moisture added to the wood fiber to eliminate such blows and delaminations.

4. The process of claim 2 including
continuously measuring the modulus of rupture and thickness of the board on exit from the continuous multi-stage press,
comparing the measured values to predetermined values, and
controlling the pressing cycle of the continuous multi-stage press and the relative amounts of resin, sealer and moisture added to the wood fiber relative to the predetermined value.

5. A process of making continuous sheets of hardboard comprising,
forming a continuous mat of indefinite length of moist wood fiber coated with a thermosetting resin and a water repellant sealer,
compressing the mat to impart sufficient strength thereto for cauless transfer thereof,
feeding the compressed mat into the nip of a continuous multi-stage press between opposed endless caul belts, the press having multiple temperature and pressure zones therein and a predetermined pressing cycle relating pressure, pressing temperatures and press speed,
applying heat and pressure to the mat, sufficient pressure being applied to compress the mat to a predetermined density and sufficient temperature applied to establish a temperature and a vapor gradient between the interior of the mat and the outer surfaces thereof in a first heating and pressure zone,
continuing the application of heat and pressure in one or more subsequent heating and pressure zones to complete cure of the resin throughout the mat,
cooling the outer surfaces of the mat under pressure in an integral cooling zone of the continuous multi-stage press to reverse the heat and vapor pressure gradient therein, and
maintaining the mat under pressure in the multi-stage press with cooling of the mat until the vapor pressure within the mat is reduced to less than the internal bond strength thereof so that, on pressure release, the mat retains sufficient moisture content to eliminate the need for subsequent humidification.

* * * * *